(12) United States Patent  
Tsugami et al.

(10) Patent No.: US 7,588,014 B2  
(45) Date of Patent: Sep. 15, 2009

(54) ELECTRONICALLY-CONTROLLED THROTTLE BODY

(75) Inventors: Hiromichi Tsugami, Chiyoda-ku (JP); Tatsuro Nagahori, Chiyoda-ku (JP); Teruhiko Moriguchi, Chiyoda-ku (JP); Shuzo Isozumi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/172,761

(22) Filed: Jul. 14, 2008

(65) Prior Publication Data  
US 2009/0205611 A1   Aug. 20, 2009

(30) Foreign Application Priority Data  
Feb. 19, 2008  (JP)  ............................. 2008-037354

(51) Int. Cl.  
*F02D 11/04*   (2006.01)  
*F02D 11/10*   (2006.01)

(52) U.S. Cl. ....................... 123/399; 123/400

(58) Field of Classification Search ................. 123/399, 123/337, 376, 396, 400, 403; 251/305, 307, 251/313  
See application file for complete search history.

(56) References Cited  
U.S. PATENT DOCUMENTS

| 5,040,508 | A | * | 8/1991 | Watanabe | 123/396 |
| 5,265,572 | A | * | 11/1993 | Kadomukai et al. | 123/396 |
| 5,777,412 | A | * | 7/1998 | Yamamoto | 310/83 |
| 6,491,019 | B1 | * | 12/2002 | Apel | 123/337 |
| 2004/0060541 | A1 | * | 4/2004 | Soshino et al. | 123/399 |

FOREIGN PATENT DOCUMENTS  
JP    2002-266666 A    9/2002

* cited by examiner

*Primary Examiner*—Mahmoud Gimie  
(74) *Attorney, Agent, or Firm*—Sughrue Mion, PLLC

(57) ABSTRACT

An electronically-controlled throttle body includes a throttle valve having a valve disc, fixed on a valve shaft rotatably supported in a body inside which an air-intake passage is formed, for varying an opening area of the air-intake passage; a reduction gear mechanism connected to the valve shaft of the throttle valve; and a motor connected to the reduction gear mechanism; rotational drive power from the motor is transmitted to the valve shaft via the reduction gear mechanism, and the opening area of the air-intake passage is varied by rotatably moving the valve disc. The reduction gear mechanism includes a planetary gear mechanism and a spur gear reduction gear mechanism, rotational drive power from the motor is decelerated by the planetary mechanism, and the decelerated rotational drive power is further decelerated by the spur gear reduction gear mechanism, and then transmitted to the valve shaft.

12 Claims, 3 Drawing Sheets

ELECTRONICALLY-CONTROLLED THROTTLE BODY

BACKGROUND OF THE INVENTION

1. Field of the Invention

The present invention relates to an electronically-controlled throttle body in which a valve disc is rotatably moved, via a reduction gear mechanism, by a motor driven in response to gas pedal operations.

2. Description of the Related Art

As shown in Japanese Laid-Open Patent Publication No. 2002-266666 (hereinafter referred to as Patent Document 1), an electronically-controlled throttle body has been heretofore known in which an opening degree of a valve disc is controlled, via a reduction gear mechanism, by a motor driven in response to gas pedal operations. In the throttle body shown in this Patent Document 1, in order to increase torque generated by the motor up to the torque needed for controlling an opening degree of the valve disc, a spur gear two-stage reduction gear mechanism is employed that performs two-step speed reduction by transmitting torque generated by the motor from an output gear fixed on the motor shaft to an intermediate gear that is placed parallel to the output gear, and further transmitting the torque transmitted to the intermediate gear to an input gear that is fixed on the valve shaft supporting the valve disc and placed parallel to the intermediate gear.

However, in a conventional electronically-controlled throttle body as described above, since torque is transmitted by the spur gear two-stage reduction gear mechanism, inter-shaft distances each are needed between the output gear shaft and the intermediate gear shaft and between the intermediate gear shaft and the input gear shaft, depending on each gear's pitch radius; therefore, the size of device is determined by those inter-shaft distances, causing a problem in that the device can not be easily downsized.

Moreover, trying to downsize the device needs to limit the pitch radius of each gear, which needs to limit the number of teeth of each gear accordingly; thereby, it becomes difficult to increase reduction gear ratios, resulting in necessary motor driving torque being greater, which has been an inhibiting factor of downsizing the motor.

Moreover, when a spur-gear two-stage reduction gear mechanism is used for the reduction gear mechanism, the output gear fixed on the motor shaft undergoes reaction force from the intermediate gear; the reaction force generates to the motor shaft bending moment whose fulcrum lies on a bearing of the motor shaft; consequently, the motor shaft undergoes both bending moment and driving torque, so that the strength of motor shaft can not be easily decreased. Therefore, the diameter of the motor shaft can not be reduced in order to secure the strength of the motor shaft, which resultantly has been an inhibiting factor of downsizing the motor.

In addition, when the spur-gear two-stage reduction gear mechanism is used for the reduction gear mechanism, the output and input gear shafts are distant from each other, as well as accuracy of inter-shaft distances among three gear shafts, namely, the output gear shaft, the intermediate gear shaft and the input gear shaft that are parallel to one another, needs to be ensured. Therefore, there has been a problem in that, even if the body is tried to be made of resin, for example, intending to cost down, production of the body becomes extremely difficult due to difficulties in ensuring accuracy of inter-shaft distances among those three gear shafts.

Furthermore, in an air-intake pipe of an engine provided with an electronically-controlled throttle body, when outside air temperature is low, moisture condenses into water after the engine stops, and the resultant water freezes when left at an ambient temperature lower than 0° C. In order to prevent condensed water from depositing in the proximity of a throttle valve so as to prevent the throttle valve from being frozen by the water, the throttle body is generally mounted at a relatively high location in the air-intake passage in the engine room. However, when the motor is located higher than a throttle valve shaft in a conventional electronically-controlled throttle body, there is concern about interference with the hood, and in order to avoid the interference, there has been such a problem as the hood line needs to be elevated. Meanwhile, when the motor is located lower than the throttle valve shaft, a hot water heating passage can not be provided on the ground side of the inner wall of the air-intake passage where condensed water is likely to deposit, which has made it difficult to take efficient countermeasures against freezing.

SUMMARY OF THE INVENTION

The present invention has been made to resolve problems as described above, and aims at providing an electronically-controlled throttle body in which the inter-shaft distance between the motor shaft and the valve shaft is shortened so as to downsize the device as a whole and driving torque required for the motor is reduced so as to reduce the diameter of the motor shaft, resultantly enabling downsizing of the motor.

In addition, by making two the number of parallel gear shafts, the invention aims at reducing locations where high accuracy of inter-shaft distances is needed, so as to resolve problems in manufacturing the body when it is resinified.

Furthermore, by placing the motor to face the valve shaft, in parallel thereto, the invention aims at providing an electronically-controlled throttle body that enables the hot water heating passage to be provided on the ground side of the inner wall of the air-intake passage even when the motor is located lower than the valve shaft.

An electronically-controlled throttle body according to the present invention includes a throttle valve having a valve disc that is fixed on a valve shaft rotatably supported in a body inside which an air-intake passage is formed, and varies an opening area of the air-intake passage; a reduction gear mechanism connected to the valve shaft of this throttle valve; a sensor for detecting a rotation angle of the valve shaft; and a motor connected to the reduction gear mechanism; rotational drive power from the motor is transmitted to the valve shaft via the reduction gear mechanism, and the opening area of the air-intake passage is varied by rotatably moving the valve disc. The reduction gear mechanism is configured including a planetary gear mechanism having a sun gear, planetary gears, an internal gear and a carrier, and a spur gear reduction gear mechanism, so that rotational drive power from the motor is decelerated by the planetary gear mechanism, the decelerated rotational drive power by the planetary gear mechanism is further decelerated by the spur gear reduction gear mechanism and then transmitted to the valve shaft.

According to the present invention, an electronically-controlled throttle body can be obtained in which the inter-shaft distance between the motor shaft and the valve shaft is shortened so that the device can be downsized as a whole, as well as the diameter of the motor shaft is made smaller so that the motor can be downsized.

Moreover, by making two the number of parallel gear shafts, the number of locations where high accuracy of inter-shaft distances is required becomes less, so that an electronically-controlled throttle body can be obtained in which manufacturing problems can be resolved when the body is resinified.

Moreover, even when the motor is located lower than the valve shaft, an electronically-controlled throttle body can be obtained that enables the hot water heating passage to be provided on the ground side of the inner wall of the air-intake passage.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
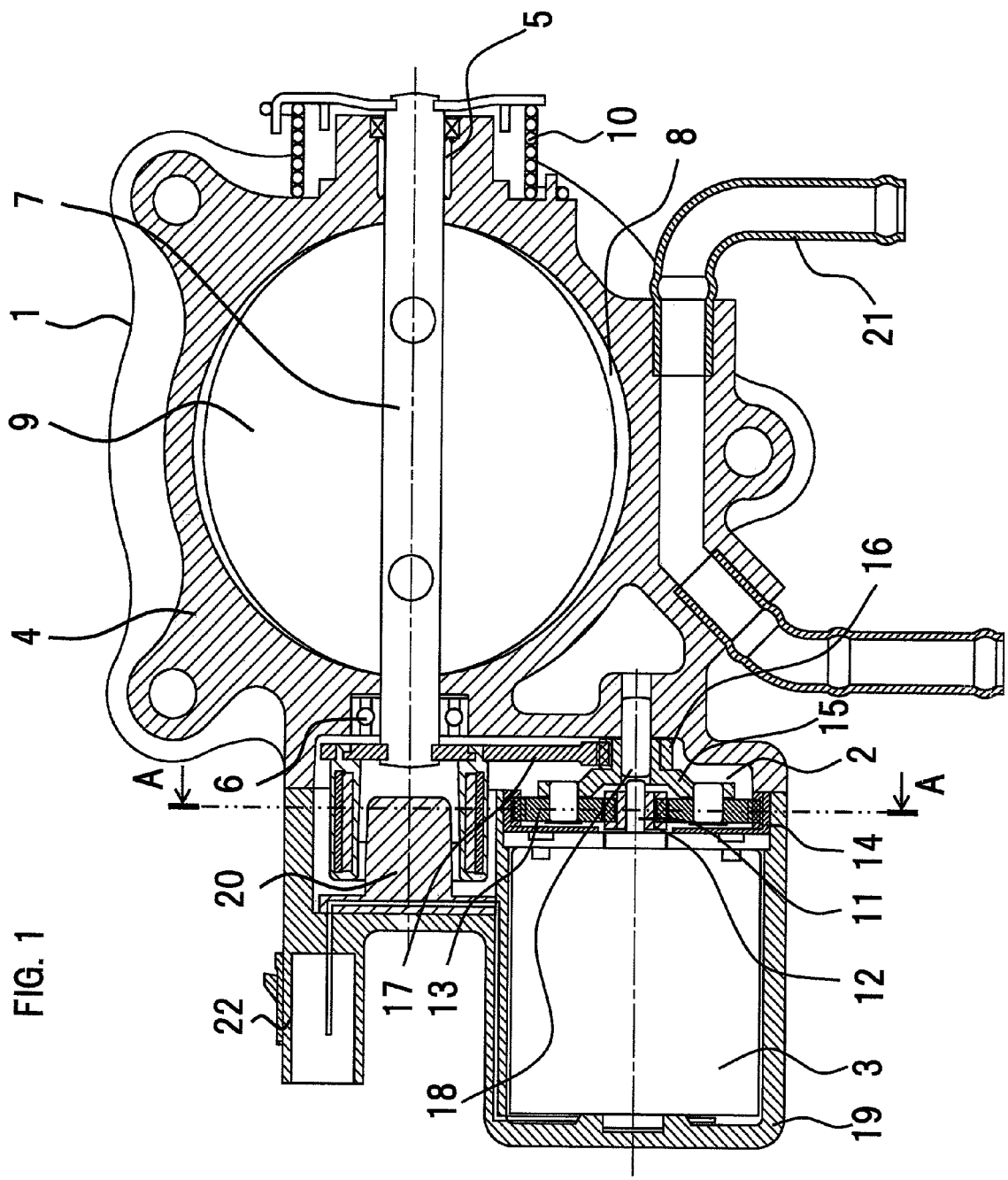
FIG. 1 is a cross-sectional view showing an electronically-controlled throttle body according to Embodiment 1 of the present invention.
Figure 2:
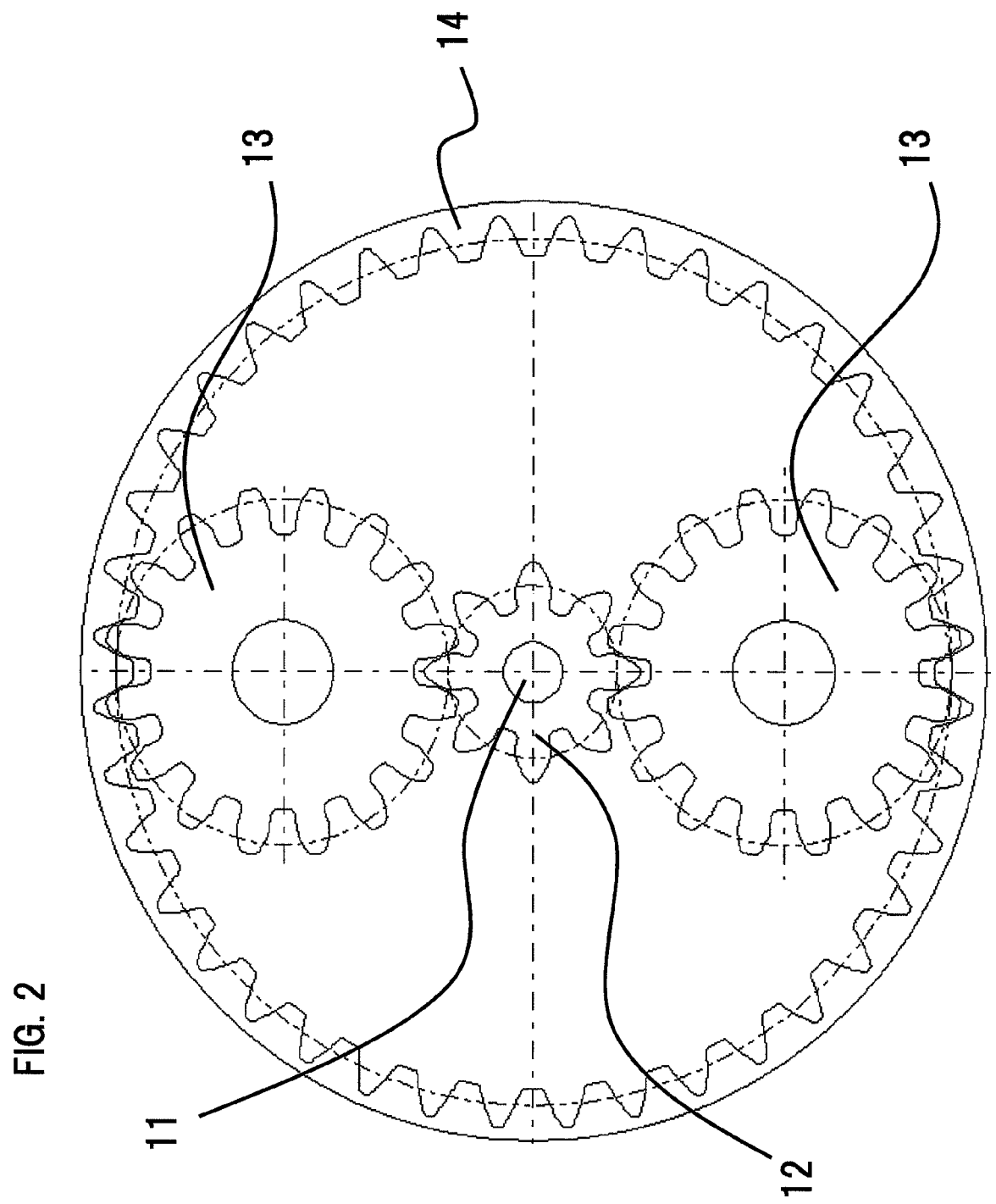
FIG. 2 is a partial-cross-sectional view along the A-A line in FIG. 1.

Hereinafter, Embodiment 1 of the present invention will be explained referring to FIG. 1 and FIG. 2. Here, parts that have the same reference numerals in each figure represent the same or corresponding ones. FIG. 1 is a cross-sectional view showing an electronically-controlled throttle body according to Embodiment 1 of the present invention; FIG. 2 is a partial cross-sectional view along the A-A line in FIG. 1. In FIG. 1 and FIG. 2, the electronically-controlled throttle body includes a throttle valve 1, a reduction gear mechanism 2 connected to the throttle valve 1 and a motor connected to this reduction gear mechanism 2.

The throttle valve 1 includes a body 4, a valve shaft that is rotatably supported by the right and left walls of the body 4 via a first bearing 5 and a second bearing 6, a valve disc 9 that is fixed on the valve shaft 7 and varies an opening area of an air-intake passage 8 formed in the body 4, and a spring 10 that is provided in the proximity of the first bearing 5 and urges the valve shaft in the valve closing direction. The body 4 is made of aluminum, formed in an approximately cylindrical shape orientated perpendicular to the drawing face of FIG. 1, inside which the air-intake passage 8 is formed. In the body 4, a hot water passage for flowing hot water is provided on the lower side of the valve shaft 7 to prevent condensed water from freezing on the air-intake passage and valve disc 9, and connected to a hose in the vehicle side by a nipple 21 press-fitted into the body 4.

The reduction gear mechanism 2 consists of planetary gear and spur gear mechanisms, and includes a sun gear 12 that is fixed by press-fitting to a motor shaft 11 of the motor 3, planetary gears 13 that mesh with the sun gear 12, an internal gear 14 that meshes with the planetary gears 13, a carrier 15 that rotatably and revoluably supports the planetary gears 13, a smaller gear 16 that is formed together with the carrier 15 on the opposite side of the planetary gears, and a larger gear 17 that is fixed on an end portion of the valve shaft 7. The larger gear 17 is fitted to the end portion of the valve shaft 7. The carrier 15 is rotatably supported by a pin 18; the pin 18 is press-fitted into the body 4. This reduction gear mechanism 2 along with the motor 3 is covered by a cover 19.

A rotation angle of the valve shaft 7 is detected by a sensor 20 that is placed in the direction toward the nearest end of the valve shaft 7 from the position on the shaft where the larger gear 17 is fixed. An opening-degree signal that the sensor has detected is transmitted outside through a connector 22 formed together with the cover 19. The connector 22 includes terminals for supplying a current to the motor 3.

In the electronically-controlled throttle body configured described above, air drawn in through an air filter (not shown) located in the upstream of the air flow is led into the air-intake passage 8 in the body 4. The volume of this air led into the passage is adjusted depending on an opening degree of the valve disc 9 rotatably moved by the motor 3 via the reduction gear mechanism 2 against the elastic force of the spring 10. This volume-adjusted air is led into the engine that is airtightly placed in the downstream of the throttle valve 1, mixed in a combustion chamber with fuel supplied from a fuel injection valve (not shown) and then ignited.

In the throttle body configured as described above according to Embodiment 1, torque generated by the motor 3 is transmitted to the smaller gear 16 as being decelerated by the sun gear 12, the planetary gears 13, the internal gear 14 and carrier 15. The torque transmitted to the smaller gear 16 is further decelerated by the larger gear 17 that meshes with the smaller gear 16, and then transmitted to the valve shaft 7.

Here, in the throttle body according to Embodiment 1, the sun gear 12 and the carrier 15 are arranged coaxially with each other owing to the structure of the planetary gear mechanism; therefore, the sun gear 12 and the smaller gear 16 are also arranged coaxially with each other, so that the number of parallel shafts becomes two, that is, the sun gear shaft and the valve shaft. For this reason, the number of parallel gear shafts can be reduced by one compared to a conventional electronically-controlled throttle body provided with a spur gear two-stage reduction gear mechanism that needs three parallel gear shafts, so that the inter-shaft distance between the motor shaft 11 and the valve shaft 7 can be significantly shortened, resulting in achieving downsizing of the device.

Moreover, as shown in FIG. 2, two gears as the planetary gears 13 are arranged on a circumference at equal intervals of 180°; therefore, the number of teeth when the sun gear 12 meshes with the planetary gears becomes twice as many as a case using one planetary gear, so that a lord that one gear undergoes is approximately halved; thereby, the strength of a gear can be decreased, as a result, teeth thereof can be thinned, which consequently enables to achieve downsizing of the device.

Moreover, by arranging the planetary gears 13 on a circumference at equal intervals, reaction force that the sun gear 12 undergoes from the two planetary gears balances at the shaft center of the sun gear 12, so that almost no bending stress is created in the motor shaft 11. Therefore, compared to a conventional electronically-controlled throttle body using a spur gear reduction gear mechanism, the strength of motor shaft can be decreased, which resultantly enables the motor shaft diameter to be smaller, achieving downsizing of the motor.

Moreover, the carrier 15 that rotatably and revoluvably supports the planetary gears is formed together with the smaller gear 16, on the opposite side where the planetary gears are supported; thereby, the layout of the reduction gear mechanism can be made compact as well as the number of components can be reduced.

Moreover, since the pin 18 that rotatably supports the carrier 15 is fixed in the body 4, accuracy of the rotation axis is determined by that of the body; therefore, discrepancy between rotation axes of the sun gear 12 and the smaller gear 16 can be diminished, so that those gears can stably mesh with each other.

Furthermore, the axial length of the pin 18 is made longer than that of the smaller gear 16; thereby, reaction force that the smaller gear 16 undergoes from the larger gear 17 can be applied to the pin uniformly along its axis, and jolting of the smaller gear and carrier 15 can be diminished, so that those gears can stably mesh with each other.

Moreover, according to the electronically-controlled throttle body of Embodiment 1, since the inter-shaft distance between the motor shaft 11 and the valve shaft 7 can be shortened as described above, the sensor 20 and input and output terminals of the motor can be easily put together by arranging them in parallel with each other. As a result, the sensor 20 and the input and output terminals of the motor can be put together in the connector 22 that is formed together with the cover 19, so that the device can be downsized as well as the length of wirings or terminals can be shortened, resulting in obtaining an inexpensive electronically-controlled throttle body.

Moreover, in the body 4, the hot water passage is provided lower than the valve shaft 7, that is, on the ground side of the inner wall of the air-intake passage 8. Thereby, a ground side portion of the inner wall of the air-intake passage 8 can be efficiently heated, enabling countermeasures against freezing to be taken; furthermore, since the motor 3 is placed lower than the valve shaft, the electronically-controlled throttle body can be mounted at a relatively high location in the engine room.

Embodiment 2

Figure 3:
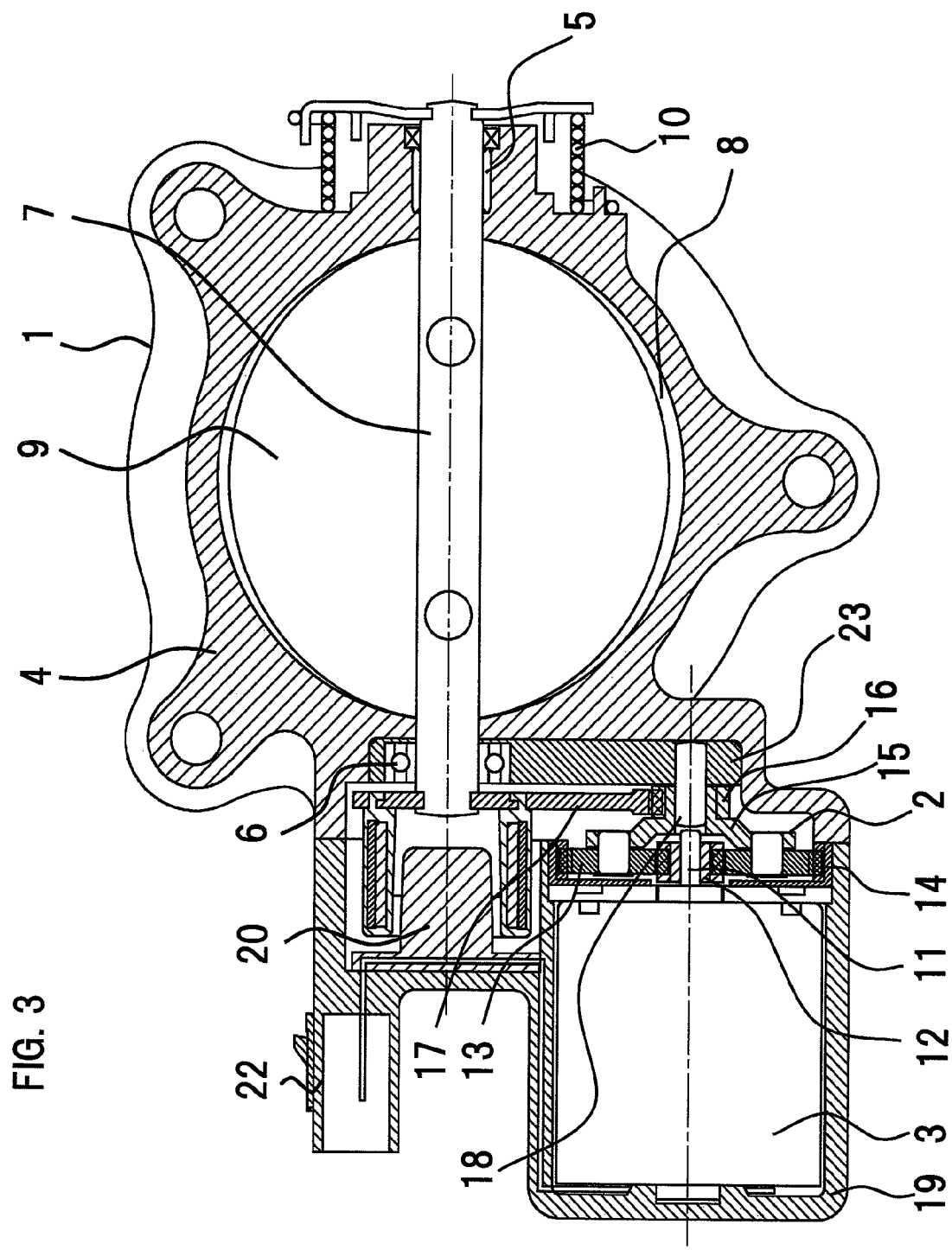
FIG. 3 is a cross-sectional view showing an electronically-controlled throttle body according to Embodiment 2 of the present invention.

FIG. 3 is a cross-sectional view showing an electronically-controlled throttle body according to Embodiment 2 of the present invention. In the figures, parts that have the same reference numerals in FIG. 1 and FIG. 2 represent the same or corresponding ones, eliminating duplicate explanations.

In the electronically-controlled throttle body according to Embodiment 2, the body 4 is molded out of resin (PPS) and the holder 23 made of brass is insert-molded into the body 4. The bearing 6 that supports the valve shaft 7 and the pin 18 that supports the smaller gear 16 are press-inserted into the holder 23.

According to Embodiment 2, since the number of gear shafts is less by one than that of a conventional electronically-controlled throttle body provided with a spur-gear two-stage reduction gear mechanism, and the number of locations where high inter-shaft accuracy is needed is also less, necessary dimensional accuracy can be assured even if the body 4 is molded out of resin, leading to achieving its cost down. In addition, since accuracy of the inter-shaft distance between the valve shaft 7 and the smaller gear 16 shaft is determined by machining accuracy of the holder 23, high accuracy of the inter-shaft distance can be achieved even if the body 4 is molded out of resin.

Various modifications and alterations of this invention will be apparent to those skilled in the art without departing from the scope and spirit of this invention, and it should be understood that this is not limited to the illustrative embodiments set forth herein.

What is claimed is:

1. An electronically-controlled throttle body, comprising:
   a throttle valve having a valve disc, fixed on a valve shaft rotatably supported in a body inside which an air-intake passage is formed, for varying an opening area of the air-intake passage;
   a reduction gear mechanism connected to the valve shaft of the throttle valve;
   a sensor for detecting a rotation angle of the valve shaft; and
   a motor connected to the reduction gear mechanism;
   rotational drive power from the motor being transmitted to the valve shaft via the reduction gear mechanism, and the opening area of the air-intake passage being varied by rotatably moving the valve disc; wherein
   the reduction gear mechanism includes a planetary gear mechanism having a sun gear, a planetary gear, an internal gear and a carrier, and a spur gear reduction gear mechanism; rotational drive power from the motor is decelerated by the planetary gear mechanism; and the decelerated rotational drive power by the planetary gear mechanism is further decelerated by the spur gear reduction gear mechanism so as to be transmitted to the valve shaft.

2. An electronically-controlled throttle body according to claim 1, wherein the planetary gear mechanism includes a sun gear fixed on the motor shaft and at least two planetary gears that mesh with the sun gear.

3. An electronically-controlled throttle body according to claim 2, wherein the planetary gears are arranged on a circumference at equal intervals.

4. An electronically-controlled throttle body according to claim 1, wherein the sun gear of the planetary gear mechanism is fitted to the motor shaft or formed together with the same.

5. An electronically-controlled throttle body according to claim 1, wherein the spur gear reduction gear mechanism includes a larger gear fixed on the valve shaft and a smaller gear fitted to the carrier supporting the planetary gears or formed together with the same on the opposite side of the planetary gears of the carrier.

6. An electronically-controlled throttle body according to claim 1, wherein the carrier is rotatably supported by a pin fixed on the throttle valve body.

7. An electronically-controlled throttle body according to claim 6, wherein the length of the pin is longer than the axial length of the smaller gear.

8. An electronically-controlled throttle body according to claim 1, wherein the sensor is placed in parallel with the motor, in the direction toward the end of the valve shaft on the reduction gear mechanism side thereof.

9. An electronically-controlled throttle body according to claim 1, wherein a cover for protecting the motor is formed together with the sensor and a connector including input and output terminals of the sensor and the motor.

10. An electronically-controlled throttle body according to claim 1, wherein the body is molded out of resin.

11. An electronically-controlled throttle body according to claim 10, wherein a bearing for supporting the throttle valve shaft and the pin for supporting the carrier are both insert-molded into one member so as to be fixed to the body.

12. An electronically-controlled throttle body according to claim 1, wherein the motor is placed opposing the valve shaft, in parallel thereto, as well as placed lower than the valve shaft so that a hot water passage is provided on the ground side of the inner wall of the air-intake passage.

* * * * *